United States Patent Office 2,742,456
Patented Apr. 17, 1956

2,742,456

METHOD OF SEPARATING ACTIN FROM MUSCLE MATERIAL

Albert E. Szent-Gyorgyi and Andrew G. Szent-Gyorgyi, Woods Hole, Mass., assignors to Armour and Company, Chicago, Ill., a corporation of Illinois No Drawing. Application November 21, 1951, Serial No. 257,641

8 Claims. (Cl. 260—112)

Our invention relates to a method of separating actin from muscle material.

The subject matter of this application is related to but distinct from the subject matter of co-pending application Ser. No. 257,642 filed on even date herewith, entitled "Recovery of Actin-Free Myosin from Muscle Material."

The solids of muscle tissue are chiefly proteins, which amount to 20% or more of the muscle substance and about 80% of the solids. Myosin is the chief protein generally accounting for approximately 40 to 50% of the total protein. Another important protein has recently been discovered in muscle tissue. This protein is actin. It is believed that actin together with myosin is responsible for the contraction and relaxation of muscles. The system of myosin particles and actin filaments comprising muscle fibers is called actomyosin. It is believed that this intimate association of actin and myosin designated by the term "actomyosin" is itself a chemical compound in which the actin and myosin are chemically bonded. Published determinations of the amount of actin in muscle have varied from 3 to 2.5%. However, it is now believed that there is approximately 1.5 to 1.8% of actin by weight.

Heretofore, actin has been separated from muscle by treating the muscle with acetone, after which the actin becomes extractable with distilled water. This is the method of Straub, as described in Studies Inst. Med. Chem. Univ. Szeged 2, 3 (1942). Actin prepared by the acetone treatment method contains considerable amounts of impurity. Determinations of the amount of impurity in the actin product have shown it to be at least 40 to 60% by weight. In this connection, reference is made to the determinations of Spicer and Gergely (J. Biol. Chem. 188, 179 (1951)), who measured the stoichiometric relations between actin and myosin and the electrophoretic pattern of actin. Similar results were obtained by Mommaerts (J. Biol. Chem. 188, 559 (1951)), who used differential ultracentrifugation. The acetone method has the further disadvantage that it cannot be applied to actomyosin. Also, the action of the acetone on the lipoidic matter and protein is not understood, and it may be that it alters the character of the actin.

Therefore, it is an object of our invention to provide a new method for separating actin from muscle material by means of which actin can be obtained of greatly increased purity, and in good yields. It is a further object of our invention to develop a method for the recovery of actin from actomyosin and other muscle material derived from muscles after the removal of part of the constituents thereof. It is a still further object of our invention to develop a method for the preparation of actin which avoids the use of anhydrous solvents such as acetone, and is built of steps which are well understood. Further objects and advantages will appear as the specification proceeds.

Polymerized actin, which is the form in which it exists in muscles, is termed F-actin, while the depolymerized or globular actin is called G-actin. The previously known methods of depolymerizing actin have not been adaptable to the separation of actin from muscle because the depolymerization was irreversible. We have now discovered that F-actin can be reversibly depolymerized to G-actin by treating F-actin with a solution of potassium iodide in the presence of adenosine triphosphate (hereinafter generally referred to as ATP). This discovery has made possible the separation of actin from a wide variety of muscle material, and by a number of related but distinct processes. The starting materials which can be used in these processes all include polymerized actin in intimate association with myosin. For example, raw muscle tissue, the residue of muscle tissue after part of the myosin has been removed therefrom, actomyosin, etc. can be employed as starting materials.

In one general phase of our process, muscle material containing polymerized actin in intimate association with myosin is treated with an aqueous solution of potassium iodide in the presence of a minor proportion of ATP. This brings about the reversible depolymerization of actin, which allows the potassium iodide solution to extract the depolymerized actin together with a large amount of myosin. The myosin is then separated from the extract by precipitating it out of the extract by means of a precipitating agent capable of selectively precipitating the myosin without denaturing the actin. The precipitating agent and potassium iodide are then removed from the supernatant by dialysis leaving the actin as residue.

When it is desired to employ raw muscle tissue as a starting material, the procedure can be somewhat varied, as will be apparent from the following discussion. The comminuted muscle tissue is treated with an aqueous solution of potassium iodide in the presence of a minute proportion of ATP. In this step, the potassium iodide solution is relatively concentrated, that is, it must contain a sufficient amount of potassium iodide to bring about the depolymerization of the actin. The potassium iodide solution should be kept below room temperature (25° C.) during the treating of the muscle, and also during the subsequent steps. We have found that it is advantageous during the extraction step to have present in the treating solution a minute proportion of sodium thiosulfate. If the muscle tissue is relatively fresh, it will already contain a substantial amount of ATP, and in many cases it will be unnecessary to add an additional amount of ATP to bring about the reversible depolymerization of the actin.

The extract from the above step will contain both actin and myosin in such proportions that it can be said to contain substantially all actomyosin. This extract can be separated from the muscle residue by any suitable means, such as filtration, centrifugation, etc.

As indicated above, this extract can immediately be treated with a precipitating agent capable of selectively precipitating the myosin. For example, ethyl alcohol can be employed as a selective precipitating agent. However, in order to effect a further purification of the actin, we prefer to first precipitate the actomyosin, while leaving substantial amounts of the impurities in solution. This can easily be done by greatly increasing the volume of the water in the solution to dilute the potassium iodide to such a point that the actin polymerizes, and the precipitate of actomyosin forms. We have also found that the formation of this precipitate can be accelerated by increasing the proportion of ATP present. The actomyosin precipitate can then be separated by any suitable means from the supernatant, and then subjected to further treatment to recover the actin.

In the alternative, as indicated above, the extract containing the actomyosin can be treated with a precipitating agent capable of selectively precipitating the myosin without denaturing the actin. Ethyl alcohol has been found to be an excellent precipitating agent for this purpose, although other alcohols and similar materials can be employed. The myosin precipitate is separated from the supernatant, and the supernatant is dialyzed to remove the alcohol and potassium iodide, while leaving the actin within the membrane. The further handling of the actin will be discussed in connection with the separation of myosin from actomyosin.

Actomyosin, which can be obtained from raw muscle tissue by the method described above or by other methods, is treated with an aqueous solution of potassium iodide in the presence of a minute proportion of ATP to again bring about the reversible depolymerization of the actin, and thereby allow the actomyosin to be dissolved. The preferred conditions for this step are substantially the same as previously set out. The solution is next treated with a suitable precipitating agent capable of selectively precipitating the myosin without denaturing the actin, such as ethyl alcohol. The myosin precipitate is separated, and the supernatant is dialyzed to remove the alcohol and potassium iodide, as previously described.

After the above steps, the residual material remaining within the membrane will be mainly actin in its depolymerized form. If desired, complete polymerization of the actin can be induced by adding a small amount of potassium chloride. Although actin is difficult to precipitate without denaturing and consequent loss of activity, this can be accomplished by isoelectric precipitation in the absence of salts.

By a large number of experiments, we have determined that at least 50% of the actin present in muscle tissue can be recovered by the above method in which actomyosin is precipitated from the potassium iodide extract, and then subsequently treated to separate the actin. The products obtained by this method have consistently averaged between 75 and 80% purity. This procedure has the further advantage in that actomyosin can be obtained from muscle tissue in a very short time, one hour or less, and the subsequent steps of treating the actomyosin to separate the actin can also be performed relatively rapidly.

It has been known for some time that myosin can be extracted from muscle tissue without depolymerizing the actin by the use of solutions of potassium chloride, or potassium chloride-phosphate. This method of removing a portion of the myosin from muscle is described by Edsall in J. Biol. Chem. 89, 289 (1930). We have now found that the muscle residue after the extraction of the myosin by the potassium chloride treatment, can be used as a starting material in our process. This starting material is preferably treated exactly as the actomyosin described above. When this modification of my process is employed, yields of around 50% of the actin present in the muscle is obtained, and the products have been found to be 73 to 75% pure on the average.

We can also employ as a starting material so-called "Myosin B," which is essentially actomyosin separated from muscle by the method of Banga and Szent-Gyorgyi as reported in Studies Inst. Med. Chem. Univ. Szeged 1, 5 (1942). The "Myosin B" can be treated as the actomyosin described above.

In the step in the processes described in which muscle material is treated with an aqueous solution of potassium iodide and ATP to bring about the reversible depolymerization of the actin, we prefer to employ the potassium iodide in about 0.5 to 0.8 molar concentrations, and the ATP in about $10^{-4}$ to $10^{-3}$ molar concentrations. During the depolymerization step and throughout the subsequent processing steps in which the actin is maintained in solution, we prefer to maintain the temperature of the solution between about 0 and 5° C.

In addition to ethyl alcohol, we have found that other agents can be employed to selectively precipitate the myosin while not substantially denaturing the actin, such as acetone, methylalcohol, etc.

Instead of potassium iodide, we can employ other alkali metal iodides, such as sodium iodide, with more or less success. We can also employ alkali metal thiocyanates, such as sodium or potassium thiocyanate, to bring about a reversible depolymerization of actin in the presence of ATP. However, we prefer to employ potassium iodide, since the alkali metal thiocyanates have some tendency to denature the protein, and therefore to diminish the desired yield.

In order to better illustrate my method and various modifications thereof, we wish to set out the following illustrative examples.

Example I

A starting material suitable for use in our process can be prepared by first extracting part of the myosin from raw muscle tissue. If desired, fresh, minced rabbit muscle can be employed. The procedure can be summarized as follows:

1. Extract the fresh, minced rabbit muscle with 3 volumes of cold KCl-phosphate for 10 minutes. Dilute the suspension with 4 volumes of 0 to 5° C. distilled water and press through a cloth.
2. Re-extract the muscle residue with 3 volumes of cold KCl-phosphate in the presence of $10^{-4}$ M ATP for 10 minutes, and dilute with 4 volumes of cold distilled water and press through a cloth.
3. Wash the residue in 10 volumes of 0 to 5° C. distilled water and press through a cloth. The muscle residue thus obtained can be immediately used or stored in frozen condition for future use.

Example II 33 g. of muscle residue obtained by the procedure of Example I was added to sufficient distilled water at 0 to 5° C. to make the total volume 100 ml. Then 1 ml. $2\times10^{-2}$ M ATP and 11 ml. 6.0 M KI containing 0.06 M sodium-thiosulfate was added. The suspension was kept in an icy water-bath and stirred for 10 min. Then 110 ml. cold distilled water was added and the insoluble part was quickly centrifuged in a refrigerated centrifuge.

The supernatant was measured, kept below 5° C., and one-fourth volume of −25° C. 96% alcohol was added. The precipitate was quickly centrifuged and the alcohol and KI were removed by dialyzing against 0.0067 M pH 7.0 phosphate buffer and $5\times10^{-5}$ M ATP at 0° C. The dialyzing tube was constantly shaken and the small volume of dialyzing liquid was changed every half hour. After 4 hours dialyzing the alcohol concentration in the dialysate was less than 1%. The precipitate was eliminated by 5 min. high speed centrifugation. The actin obtained was mostly in its F-form. To attain complete polymerization, 2 ml. saturated KCl were added to every 100 ml. fluid and the solution was kept at room temperature for 30–60 min.

About 50% of the actin content of the muscle was obtained in the final solution, and it was found to have a purity of around 75%.

Example III

In another experiment, 200 g. of fresh muscle were treated by the procedures of Examples I and II. At the end of the steps described in Example I, the weight of the muscle residue was still 200 g. owing to its hydration. 33 g. of this muscle residue was treated as described in Example II. Finally a 250 ml. solution was obtained containing 1.665 mg./ml. total protein, of which 1.21 mg./ml. was actin. The actin obtained was thus 73% pure, and the total yield of pure actin was 302.5 mg.

This result can be regarded as typical of those obtained by starting with fresh muscle and following the procedures of Examples I and II. In a large number of preparations, the yield did not vary substantially from

Example IV

For the preparation of actomyosin with KI mostly frozen rabbit muscle was used, though freezing was not essential. To 50 g. muscle 130 ml. cold distilled water, $2 \times 10^{-4}$ M ATP and 20 ml. 6.0 M KI containing 0.06 M sodium-thiosulfate were added and stirred for 10 min. under ice cooling. (The addition of ATP was omitted if started from fresh muscle.) Then 150 ml. cold distilled water was added and the suspension was stirred for 5 min. The muscle residue was eliminated by a short centrifugation, the supernatant measured and 4 volumes of distilled water of room temperature was slowly added with constant stirring. Then 10 mg. ATP was introduced to every 100 ml. The superprecipitate settled down in about 5 min. The liquid was decanted and the precipitate centrifuged at room temperature for 10 min.

Example V

The precipitate obtained in Example IV was cooled below 5° C. and $2 \times 10^{-4}$ M ATP and 6.0 M KI containing 0.06 M sodium-thiosulphate were added to bring the final KI concentration to 0.6 M. After 10 min. storage the solution was diluted with an equal volume of cold distilled water and one-fourth volume of $-25°$ C. 96% alcohol was added. The precipitate was removed in a refrigerated centrifuge and the supernatant was dialyzed against 0.0067 M pH 7.0 phosphate buffer containing $5 \times 10^{-5}$ M ATP. The small quantity of precipitate was separated in the centrifuge and complete polymerization was induced by adding 2 ml. saturated KCl to every 100 ml. of the supernatant.

The actin product was determined to have a purity of about 78%.

Example VI

Following the procedure of Examples IV and V, using potassium iodide for actomyosin extraction, about 2 g. actomyosin, containing 250 mg. actin was extracted from 50 g. muscle. This may be regarded as typical of the process, and in general the final yeld of actin from 50 g. muscle was from 120 to 160 mg. of 75 to 80% purity.

Example VII

"Myosin B" was prepared according to the method of Banga and Szent-Gyorgyi (Studies Inst. Med. Chem. Univ. Szeged 1, 5 (1942)). The "Myosin B" was twice precipitated in 0.1 M KCl. To the final precipitate were added an equal volume of distilled water at room temperature and 0.1 mg. ATP to every ml. The suspension was left to stand for 5 minutes, and then centrifuged for 10 minutes.

The "Myosin B" was then subjected to the procedure described in Example 5 for actomyosin. The actin obtained from "Myosin B" as a starting material was found to be of a high degree of purity, although in most cases it was not quite as pure as that obtained from actomyosin.

Example VIII 100 g. of muscle were treated as in Example I. 33 g. of the muscle residue obtained was added to 100 ml. of a solution containing 0.6 M KCl, 0.1 M potassium thiocyanate and $2 \times 10^{-4}$ M ATP. The suspension was kept in icy water bath and stirred for 10 min. Then 100 ml. of cold distilled water were added and the insoluble part was centrifuged in a refrigerated centrifuge.

The supernatant was measured, kept below 5° C., and one-fourth volume of $-25°$ C. 95% alcohol was added. The precipitate was eliminated by centrifugation and the alcohol and potassium thiocyanate were removed by dialyzing against 0.0067 M pH 7.0 phosphate buffer and $5 \times 10^{-5}$ M ATP at 0° C. The actin obtained was made to polymerize by the addition of 2 ml. saturated KCl to every 100 ml. fluid and was kept at room temperature for 30–60 min.

50%, and the purity of the product was generally between 73 and 75%.

Example IX

The procedure of Example II can be substantially followed except that an equivalent amount of sodium iodide solution is substituted for the potassium iodide solution to obtain the actin.

While in the foregoing specification we have set forth specific details of our process and of certain modifications thereof, it will be apparent to those skilled in the art that many of these details can be varied widely without departing from the spirit of our invention.

We claim:

1. In a method of separating actin from muscle material containing polymerized actin in intimate association with myosin, the step of extracting said muscle material with an aqueous solution of potassium iodide in the presence of adenosine triphosphate, said extraction being carried out at a temperature between about 0 to 5° C., said potassium iodide being present in said solution in a molar concentration of about .5 to .8, and said adenosine triphosphate being present in a molar concentration between about $10^{-4}$ to $10^{-3}$.

2. The method of separating actin from muscle tissue, comprising extracting the muscle tissue with an aqueous solution of an alkali metal salt selected from the group consisting of potassium and sodium iodides and thiocyanates, said solution containing a sufficient concentration of said salt to depolymerize the actin in said muscle tissue, the adenosine triphosphate contained in said muscle tissue together with any adenosine triphosphate in said aqueous solution being such that the extraction takes place in the presence of at least a $10^{-4}$ molar concentration of adenosine triphosphate, thereby obtaining a supernatant containing myosin and reversibly depolymerized actin, and then selectively precipitating the myosin from said supernatant without denaturing the actin.

3. The method of claim 2 in which said salt is potassium iodide and the concentration thereof in said solution is from about 0.5 to 0.8 molar concentration, and in which said extraction takes place in the presence of from $10^{-4}$ to $10^{-3}$ molar concentration of adenosine triphosphate.

4. The method of separating actin from actomyosin, comprising dissolving the actomyosin in an aqueous solution of an alkali metal salt selected from the group consisting of potassium and sodium iodides and thiocyanates, said solution containing a sufficient concentration of said salt to depolymerize the actin in said actomyosin, the adenosine triphosphate contained in said muscle tissue together with any adenosine triphosphate in said aqueous solution being such that the extraction takes place in the presence of at least a $10^{-4}$ molar concentration of adenosine triphosphate, thereby obtaining a supernatant containing myosin and reversibly depolymerized actin, and then selectively precipitating the myosin from said supernatant without denaturing the actin.

5. The method of claim 4 in which said salt is potassium iodide and the concentration thereof in said solution is from about 0.5 to 0.8 molar concentration, and in which said extraction takes place in the presence of from $10^{-4}$ to $10^{-3}$ molar concentration of adenosine triphosphate.

6. The method of separating actin from actomyosin, comprising dissolving the actomyosin in an aqueous solution of potassium iodide in the presence of adenosine triphosphate, said dissolving being carried out at a temperature between about 0 to 5° C., said potassium iodide being present in said solution in a molar concentration of about .5 to .8, and said adenosine triphosphate being present in a molar concentration between about $10^{-4}$ to $10^{-3}$, thereby obtaining a solution of myosin and reversibly depolymerized actin, and then adding ethyl alcohol to said solution to precipitate the myosin therefrom without denaturing the actin.

7. In the method of separating actin from actomyosin, the step comprising dissolving the actomyosin in an aqueous solution of an alkali metal salt selected from the group consisting of potassium and sodium iodide and thiocyanate in the presence of adenosine triphosphate, said solution containing a sufficient concentration of said salt to depolymerize the actin in said actomyosin, the adenosine triphosphate contained in the actomyosin together with the adenosine triphosphate in said solution being such that the actomyosin is dissolved in the presence of at least a $10^{-4}$ molar concentration of adenosine triphosphate, thereby solubilizing the actin and myosin and reversibly depolymerizing the actin.

8. The method step of claim 7 in which said salt is potassium iodide and it is present in said solution in a molar concentration of from .5 to .8, and in which said actomyosin is dissolved in the presence of from $10^{-4}$ to $10^{-3}$ molar concentration of adenosine triphosphate.

References Cited in the file of this patent

Ranzi: Nature, vol. 160, No. 4073, page 712, November 22, 1947.

Edsall: J. Biol. Chem., vol. 89, pp. 289–313 (1930).

Szent-Giorgyi: J. Coll. Sci., vol. 1, pages 1–11 (1946).

Dainty et al.: J. Gen. Physiol., vol. 27, 1944, pp. 355–99.